United States Patent
Aspro et al.

(10) Patent No.: US 11,715,074 B2
(45) Date of Patent: *Aug. 1, 2023

(54) INTEGRATED HOME SCORING SYSTEM

(71) Applicant: The Toronto-Dominion Bank, Toronto (CA)

(72) Inventors: Salvatore Aspro, Vaughan (CA); Masashi Kobayashi, Toronto (CA); Jinoj Titus, Oshawa (CA)

(73) Assignee: The Toronto-Dominion Bank, Toronto (CA)

( * ) Notice: Subject to any disclaimer, the term of this patent is extended or adjusted under 35 U.S.C. 154(b) by 0 days.

This patent is subject to a terminal disclaimer.

(21) Appl. No.: 17/546,225

(22) Filed: Dec. 9, 2021

(65) Prior Publication Data

US 2022/0101275 A1 Mar. 31, 2022

Related U.S. Application Data

(63) Continuation of application No. 16/939,619, filed on Jul. 27, 2020, now Pat. No. 11,232,873.

(51) Int. Cl.
| | |
|---|---|
| *G06F 15/173* | (2006.01) |
| *G06Q 10/20* | (2023.01) |
| *G16Y 40/40* | (2020.01) |
| *G16Y 40/20* | (2020.01) |
| *G16Y 10/80* | (2020.01) |
| *H04L 41/06* | (2022.01) |
| *G06Q 50/16* | (2012.01) |

(52) U.S. Cl.
CPC ............. *G06Q 10/20* (2013.01); *G16Y 10/80* (2020.01); *G16Y 40/20* (2020.01); *G16Y 40/40* (2020.01); *H04L 41/06* (2013.01); *G06Q 50/163* (2013.01)

(58) Field of Classification Search
None
See application file for complete search history.

(56) References Cited

U.S. PATENT DOCUMENTS

| | | |
|---|---|---|
| 9,049,168 B2 | 6/2015 | Jacob et al. |
| 9,947,202 B1 * | 4/2018 | Moon ................... G08B 21/10 |
| 10,032,224 B2 | 7/2018 | Helitzer et al. |
| 10,453,149 B1 | 10/2019 | Gaudin et al. |
| 10,510,121 B2 | 12/2019 | Allen et al. |

(Continued)

OTHER PUBLICATIONS

USPTO, Office Action relating to U.S. Appl. No. 16/939,619 dated May 14, 2021.

(Continued)

*Primary Examiner* — Wing F Chan
*Assistant Examiner* — Andrew Woo
(74) *Attorney, Agent, or Firm* — Rowand LLP

(57) ABSTRACT

A processor-implemented method is disclosed. The method includes: obtaining sensor readings from sensors associated with a first home and a plurality of second homes; determining a set of prioritized maintenance items for the first home based on comparing sensor readings from sensors associated with the plurality of second homes to identify and rank maintenance items; detecting one or more maintenance events associated with one or more of the set of the prioritized maintenance items for the first home; and outputting a live home score for the first home based on detecting the one or more maintenance events.

20 Claims, 8 Drawing Sheets

(56) References Cited

U.S. PATENT DOCUMENTS

| | | |
|---|---|---|
| 2014/0136242 A1 | 5/2014 | Weekes et al. |
| 2014/0358592 A1* | 12/2014 | Wedig .................... G06Q 40/08 705/4 |
| 2016/0104250 A1* | 4/2016 | Allen ................. G06K 9/00536 705/50 |
| 2019/0035028 A1 | 1/2019 | Jones et al. |
| 2019/0087903 A1 | 3/2019 | Fields et al. |

OTHER PUBLICATIONS

Canadian Application No. 3,088,080, Office Action dated Jan. 25, 2023.

\* cited by examiner

INTEGRATED HOME SCORING SYSTEM

CROSS-REFERENCE TO RELATED APPLICATION

The present application is a continuation of U.S. patent application Ser. No. 16/939,619 entitled "Integrated Home Scoring System", filed on Jul. 27, 2020, the contents of which are herein incorporated by reference.

TECHNICAL FIELD

The present application relates to sensor systems and, more particularly, to systems and methods for using sensor data for home monitoring and control.

BACKGROUND

The advent of smart home sensors has enabled collection of a wide range of data relating to homes. From door and window sensors to water leak and fire detectors, sensor devices can help to avoid home and property damage. In particular, home sensors may be used to detect various conditions in connection with a property and to facilitate automation of certain tasks (e.g. maintenance tasks, etc.) for a property.

BRIEF DESCRIPTION OF THE DRAWINGS

Embodiments are described in detail below, with reference to the following drawings.

Like reference numerals are used in the drawings to denote like elements and features.

DETAILED DESCRIPTION OF VARIOUS EMBODIMENTS

Figure 1:
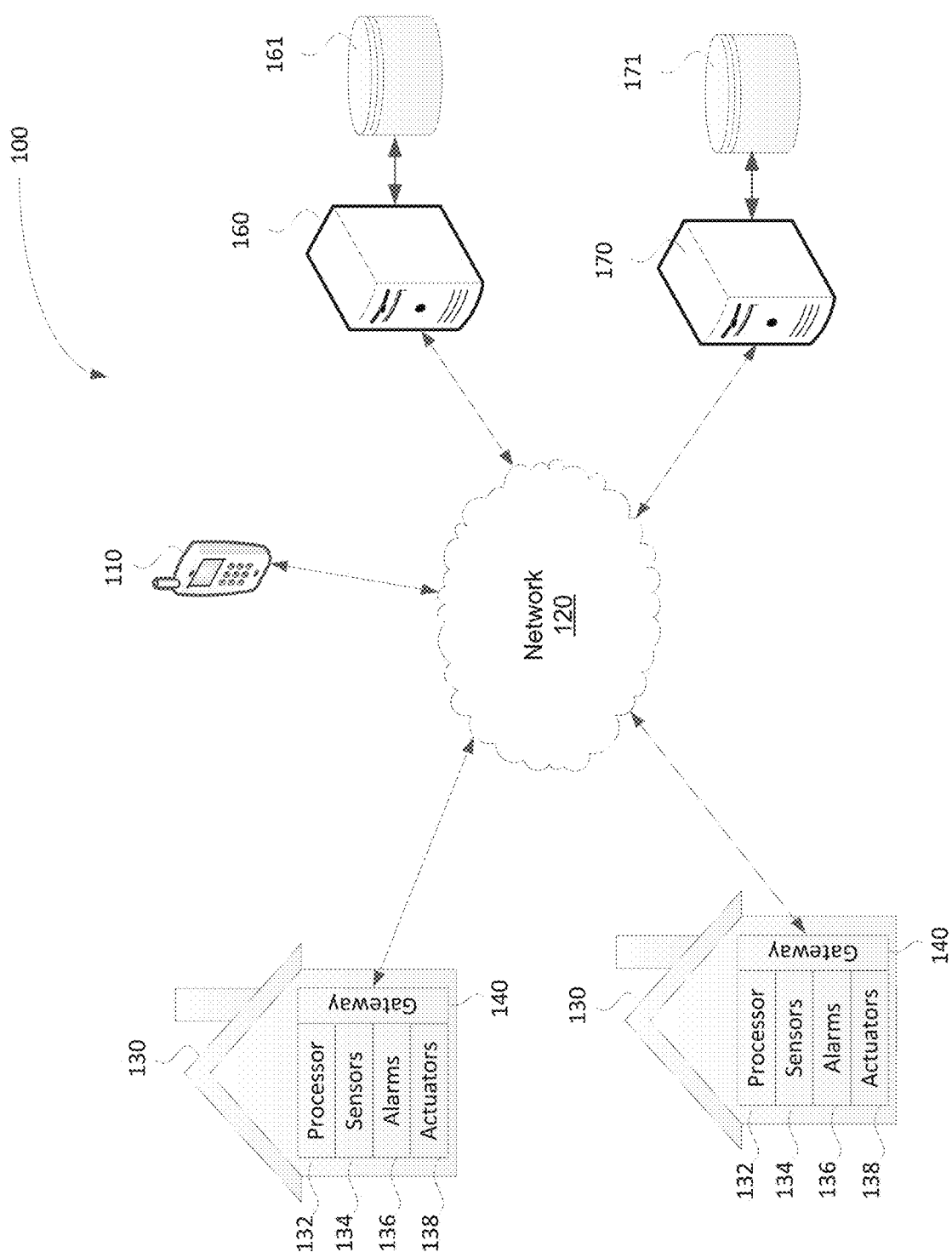
FIG. 1 is a schematic diagram illustrating an operating environment of an example embodiment.

In an aspect, a computing system is disclosed. The computing system includes a processor and a memory coupled to the processor. The memory stores instructions that, when executed, configure the processor to: obtain sensor readings from sensors associated with a first home and a plurality of second homes; determine a set of prioritized maintenance items for the first home based on comparing sensor readings from sensors associated with the plurality of second homes to identify and rank maintenance items; detect one or more maintenance events associated with one or more of the set of the prioritized maintenance items for the first home; and output a live home score for the first home based on detecting the one or more maintenance events.

In some implementations, the sensors may include at least one of: a water flow meter, a home alarm sensor, a water leak sensor, an electric power consumption meter, or a door and window sensor.

In some implementations, the live home score for the first home may represent a score that is relative to live home scores for the plurality of second homes.

In some implementations, the live home score for the first home may be determined based on first sensor readings from sensors associated with the first home, second sensor readings from the sensors associated with the plurality of second homes, and geographic location data associated with the first home.

In some implementations, the first sensor readings may be obtained from first sensors and the second sensor readings may be obtained from second sensors corresponding to the first sensor.

In some implementations, the instructions, when executed, may further configure the processor to identify the plurality of second homes based on determining that the second homes satisfy one or more similarity criteria with respect to the first home.

In some implementations, the instructions, when executed, may further configure the processor to receive, from a device associated with the first home, a request for the live home score and the live home score may be outputted responsive to receiving the request.

In some implementations, the instructions, when executed, may further configure the processor to send the live home score and a message indicating at least a subset of the set of the prioritized maintenance items as maintenance recommendations to the device associated with the first home.

In some implementations, the set of the prioritized maintenance items may be determined based on at least one of weather data for a geographic region associated with the first home or utility usage data associated with the first home.

In some implementations, the instructions, when executed, may further configure the processor to: determine a set of utility usage recommendation items for the first home based on the sensor readings from the sensors associated with the plurality of second homes; and send, to a first device associated with the first home, a message indicating at least a subset of the set of the utility usage recommendation items.

In another aspect, a processor-implemented method is disclosed. The method includes: obtaining sensor readings from sensors associated with a first home and a plurality of second homes; determining a set of prioritized maintenance items for the first home based on comparing sensor readings from sensors associated with the plurality of second homes to identify and rank maintenance items; detecting one or more maintenance events associated with one or more of the set of the prioritized maintenance items for the first home; and outputting a live home score for the first home based on detecting the one or more maintenance events.

Other aspects and features of the present application will be understood by those of ordinary skill in the art from a review of the following description of examples in conjunction with the accompanying figures.

In the present application, the term "and/or" is intended to cover all possible combinations and sub-combinations of the listed elements, including any one of the listed elements alone, any sub-combination, or all of the elements, and without necessarily excluding additional elements.

In the present application, the phrase "at least one of . . . or . . . " is intended to cover any one or more of the listed elements, including any one of the listed elements alone, any sub-combination, or all of the elements, without necessarily excluding any additional elements, and without necessarily requiring all of the elements.

In the present application, the term "live property score" refers to a score that is obtained in real-time (or near real-time) for a specific property. A live property score may be defined for a building, such as a residential building (e.g. house, condominium, apartment, etc.) or a commercial building (e.g. office or retail building). More specifically, a live property score for a building may be a value or other indicator that represents certain real-time information about the building. In some embodiments, a live property score for a building may be a value of a metric, such as a qualitative measurement or an approximation for otherwise qualitative property/properties, associated with the building. For example, a live home score may be a score that represents a current risk level associated with a house. In particular, a live home score for a house may be a representation of an overall risk associated with insuring a house. The live home score may be derived based on various factors relating to a house such as sensor data (e.g. number of sensors, sensor readings, etc.), location information, age of the house, neighbourhood, structural design (e.g. electrical system), and type of house, among others. In different contexts, the term "live property score" may be used interchangeably with other terms, such as "live home score", "live building score", etc.

Example embodiments of the present application are not limited to any particular operating system, system architecture, mobile device architecture, server architecture, or computer programming language.

FIG. 1 is a schematic operation diagram illustrating an operating environment 100 of an example embodiment. As shown in FIG. 1, the operating environment 100 includes one or more client devices 110, property sensor systems 130, a resource server 160, an insurance server 170, and a communications network 120 connecting one or more components of the operating environment 100.

The resource server 160 (which may also be referred to as a server computer system) and client device 110 communicate via the network 120. In at least some embodiments, the client device 110 is a computing device. The client device 110 may take a variety of forms including, for example, a mobile communication device such as a smartphone, a tablet computer, a wearable computer (e.g. a head-mounted display, smartwatch, etc.), a laptop or desktop computer, or a computing device of another type. The client device 110 may be associated with a client entity (e.g. an individual, a business, etc.) having resources that are managed by or using the resource server 160. For example, the resource server 160 may be a financial institution server and the client entity may be a customer of a financial institution operating the financial institution server. The client device 110 may store software instructions that cause the client device to establish communications with the resource server 160.

The resource server 160 may track, manage, and maintain resources, make lending decisions, and/or lend resources to client entities. The resources may, for example, be computing resources, such as memory or processor cycles. In at least some embodiments, the resources may include stored value, such as fiat currency, which may be represented in a database. For example, the resource server 160 may be coupled to a database 161, which may be provided in secure storage. The secure storage may be provided internally within the resource server 160 or externally. The secure storage may, for example, be provided remotely from the resource server 160. In some embodiments, the secure storage may include one or more data centers. The data centers may, for example, store data with bank-grade security.

The database 161 may include records for a plurality of accounts and at least some of the records may define a quantity of resources associated with the client entity. For example, the client entity may be associated with an account having one or more records in the database 161. The records may reflect a quantity of stored resources that are associated with the client entity. Such resources may include owned resources and, in at least some embodiments, borrowed resources (e.g. resources available on credit). The quantity of resources that are available to or associated with the client entity may be reflected by a balance defined in an associated record such as, for example, a bank balance.

In at least some embodiments, the database 161 may store various types of information in connection with customers of a business entity that administers the resource server 160. For example, the database 161 may store customer profile data and financial account data associated with customers. The customer profile data may include, without limitation, personal information of registered customers, authentication credentials of the customers, account identifying information (e.g. checking account, savings account, revolving credit line, etc.), and information identifying services (e.g. banking services, investment management services, etc.) and/or programs that are offered to the customers by the business entity. The financial account data may include portfolio data relating to portfolios of investments that are held by customers.

The business entity associated with the resource server 160 may provide various services that are accessible to the client entity. For example, the business entity may provide account management services, financial transaction services, and investment management services for the client entity. In at least some embodiments, the resource server 160 may be configured to provide a user interface that allows client devices 110 to access the services offered by the business entity. By way of example, the resource server 160 may be configured to provide a website or web-based portal which can be accessed via the client devices 110. The website (or portal) may include web content corresponding to various services offered by the business entity, and the resource server 160 may provide the web content for display on the client devices 110. As another example, the resource server 160 may be associated with a software application which may be installed and/or run on the client devices 110. In some embodiments, the resource server 160 may be a backend server for an application (e.g. mobile app, web application, etc.) which may be accessed on the client device 110. The application may, for example, be a mobile banking application, an investment management application, or a property control and management application (e.g. smart home automation app). A graphical user interface (GUI) associated with the application may present the content corresponding to the services offered by the business entity on a display associated with the client device 110. A customer may interact with the business entity and its service offerings via the GUI of the application.

The insurance server 170 may be associated with an insurance company (and more generally, a merchant of insurance policies). The insurance server 170 may maintain data associated with insurance policies that are provided by the insurance company. For example, the insurance server 170 may store or be connected to a database 171 containing policy data for a plurality of insurance policies. The database 171 may include records for a plurality of insurance policy accounts associated with customer entities. That is, the secure data of database 171 may comprise insurance policy account data for one or more customer entities. The secure data may include personal data, such as personal identification information. The personal identification information may include any stored personal details associated with a customer entity including, for example, name, age, date of birth, gender, identifying information relating to one or more properties, work or mailing address, contact information such as a messaging address (e.g. email address), and/or a telephone number, a government-issued identifier such as a social insurance number (SIN) and/or driver's license number, etc.

The property sensor system 130 includes, at least, a processor 132, sensors 134, alarms 136, actuators 138, and a gateway 140. A property sensor system 130 is associated with a specific real property, and can be used for monitoring the environmental conditions for a building. In particular, a property sensor system 130 associated with a building may manage sensors that are positioned at various locations throughout the building.

The processor 132 is communicably coupled to the sensors 134, alarms 136, and the actuators 138. The processor 132 is configured to obtain sensor readings from the sensors 134 and control the alarms 136 and the actuators 138. In at least some embodiments, the processor 132 may control the alarms 136 and/or the actuators 138 based on, for example, inputted commands of an operator of the property sensor system 130, control policies for the property sensor system 130, instructions that are received from an external source (e.g. property management server), and sensor readings obtained from the sensors 134. The control policies may define various conditions, events, etc. for the property sensor system 130 and associated actions to execute in relation to the alarms 136 and the actuators 138.

The sensors 134 may include measurement devices, detectors, and/or sensors. In some embodiments, the sensors 134 may be Internet of Things (IoT) sensors; that is, smart sensors that enable IoT applications and are part of a wireless sensor network. For example, the sensors 134 may include one or more of: motion detectors, door sensors, window sensors, temperature sensors, smart thermostats, light intensity sensors, humidity sensors, water pressure sensors, video doorbell, smoke and carbon monoxide detectors, weather sensors (for exterior conditions), anemometers, air quality sensors, leak/moisture detectors, or energy meters. Each of the sensors 134 may be configured to provide sensor data (including sensor readings) to the processor, other sensor nodes of a wireless sensor network, a centralized data store, and/or other computing system for analytics of the sensor data.

The alarms 136 include devices that can generate alerts in response to certain detected conditions. For example, the alarms 136 may include devices such as smoke alarms, flood alarms, and security alarms. In some embodiments, the alarms 136 may be self-contained devices having one or more detectors/sensors.

The actuators 138 include devices and/or sensors (e.g. switches/relays, motors, valves, etc.) for controlling various devices within a building. The actuators 138 may be configured for controlling, for example, light fixtures, fans, appliances, outlets, door locks, water shutoff valves, etc. Examples of actuators 138 include smart locks, smart power outlets, and door controls.

The processor 132 may be configured to send control information to some or all of the sensors 134, the alarms 136, and the actuators 138. The processor 132 may be coupled to a memory that stores data relating to the sensors 134, the alarms 136, and/or the actuators 138. For example, the memory may store identifying information, historical state information, and trigger conditions associated with the sensors 134, the alarms 136, and/or the actuators 138.

As shown in FIG. 1, the processor 132 may be connected to the network 120 via a gateway 140. The gateway 140 may be a network interface, such as a network interface card, chip set, etc., of a device that also includes the processor 132. In some embodiments, the gateway 140 may be omitted, and components of the property sensor system 130 may communicate directly with cloud-based infrastructures.

The network 120 is a computer network. In some embodiments, the network 120 may be an internetwork such as may be formed of one or more interconnected computer networks. For example, the network 120 may be or may include an Ethernet network, an asynchronous transfer mode (ATM) network, a wireless network, or the like. The network 120 may, in some embodiments, include a plurality of distinct networks. For example, communications between certain of the computer systems may be over a private network whereas communications between others of the computer systems may be over a public network (e.g. the Internet).

Figure 2:
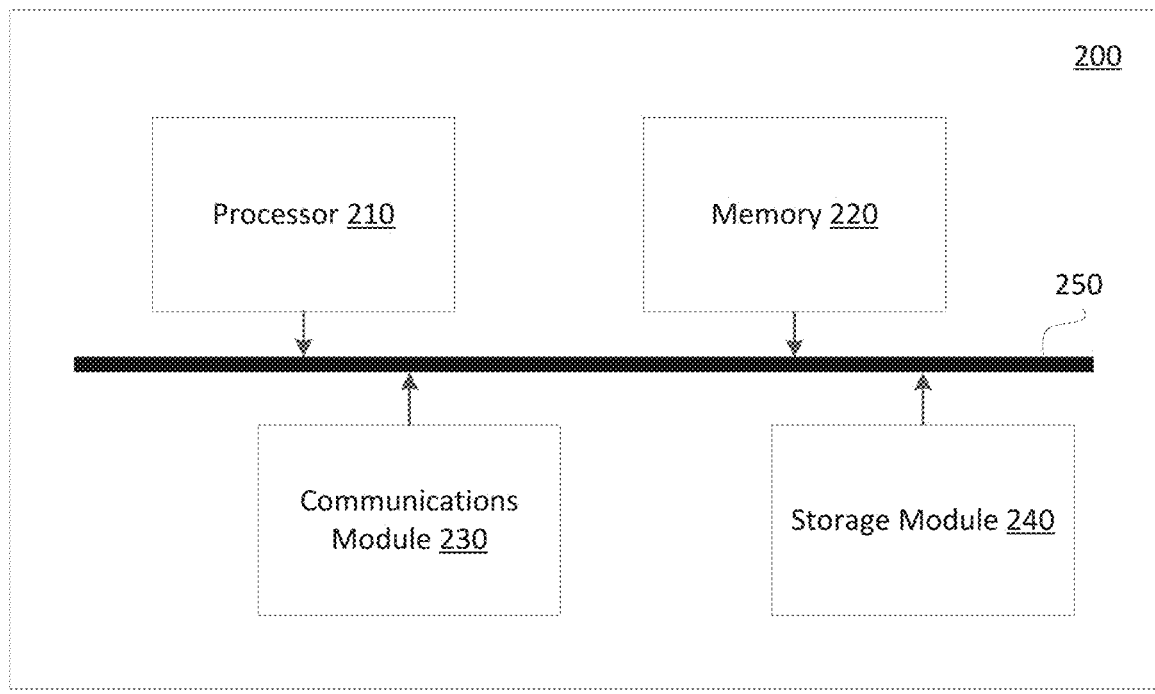
FIG. 2 is high-level schematic diagram of a computing device.

Referring now to FIG. 2, a high-level operation diagram of an example computing device 200 will now be described. The example computing device 200 may be exemplary of the client devices 110, property sensor systems 130, the resource server 160, and/or the insurance server 170.

The example computing device 200 includes numerous different modules. For example, as illustrated, the example computing device 200 may include a processor 210, a memory 220, a communications module 230, and/or a storage module 240. As illustrated, the foregoing example modules of the example computing device 200 are in communication over a bus 250.

The processor 210 is a hardware processor. The processor 210 may, for example, be one or more ARM, Intel x86, PowerPC processors or the like.

The memory 220 allows data to be stored and retrieved. The memory 220 may include, for example, random access memory, read-only memory, and persistent storage. Persistent storage may be, for example, flash memory, a solid-state drive or the like. Read-only memory and persistent storage are a non-transitory computer-readable storage medium. A computer-readable medium may be organized using a file system such as may be administered by an operating system governing overall operation of the example computing device 200.

The communications module 230 allows the example computing device 200 to communicate with other computing devices and/or various communications networks. For example, the communications module 230 may allow the example computing device 200 to send or receive communications signals. Communications signals may be sent or received according to one or more protocols or according to one or more standards. For example, the communications module 230 may allow the example computing device 200 to communicate via a cellular data network, such as for example, according to one or more standards such as, for example, Global System for Mobile Communications (GSM), Code Division Multiple Access (CDMA), Evolution Data Optimized (EVDO), Long-term Evolution (LTE) or the like. Additionally, or alternatively, the communications module 230 may allow the example computing device 200 to communicate using near-field communication (NFC), via WiFi™, using Bluetooth™, or via some combination of one or more networks or protocols. In some embodiments, all or a portion of the communications module 230 may be integrated into a component of the example computing device 200. For example, the communications module may be integrated into a communications chipset.

The storage module 240 allows the example computing device 200 to store and retrieve data. In some embodiments, the storage module 240 may be formed as a part of the memory 220 and/or may be used to access all or a portion of the memory 220. Additionally, or alternatively, the storage module 240 may be used to store and retrieve data from persisted storage other than the persisted storage (if any) accessible via the memory 220. In some embodiments, the storage module 240 may be used to store and retrieve data in a database. A database may be stored in persisted storage. Additionally, or alternatively, the storage module 240 may access data stored remotely such as, for example, as may be accessed using a local area network (LAN), wide area network (WAN), personal area network (PAN), and/or a storage area network (SAN). In some embodiments, the storage module 240 may access data stored remotely using the communications module 230. In some embodiments, the storage module 240 may be omitted and its function(s) may be performed by the memory 220 and/or by the processor 210 in concert with the communications module 230 such as, for example, if data is stored remotely. The storage module 240 may also be referred to as a data store.

Software comprising instructions is executed by the processor 210 from a computer-readable medium. For example, software may be loaded into random-access memory from persisted storage of the memory 220. Additionally, or alternatively, instructions may be executed by the processor 210 directly from read-only memory of the memory 220.

The computing device 200 may include other components apart from those illustrated in FIG. 2 and the specific component set may differ based on whether the computing device 200 is operating as the client devices 110, the property sensor systems 130, the resource server 160, or the insurance server 170. For example, the computing device 200 may include one or more input modules, which may be in communication with the processor 210 (e.g., over the bus 250). The input modules may take various forms including, for example, a mouse, a microphone, a camera, a touchscreen overlay, a button, a sensor, etc. By way of further example, the computing devices 200 may include one or more output modules, which may be in communication with the processor 210 (e.g., over the bus 250). The output modules include one or more display modules which may be of various types including, for example, liquid crystal displays (LCD), light emitting diode displays (LED), cathode ray tube (CRT) displays, etc. By way of further example, the output modules may include a speaker.

Figure 3:
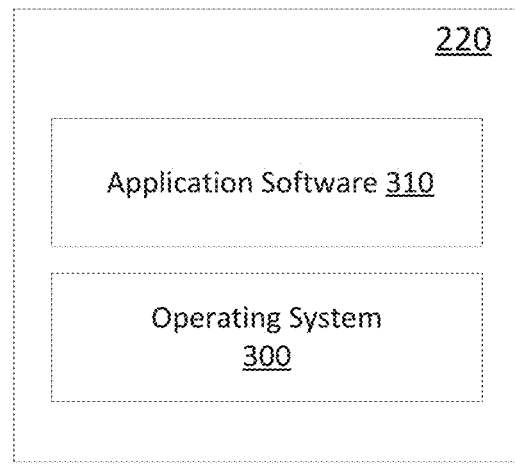
FIG. 3 shows a simplified organization of software components stored in a memory of the computing device of FIG. 2.

FIG. 3 depicts a simplified organization of software components stored in the memory 220 of the example computing device 200 (FIG. 2). As illustrated, these software components include an operating system 300 and an application software 310.

The operating system 300 is software. The operating system 300 allows the application software 310 to access the processor 210 (FIG. 2), the memory 220, and the communications module 230 of the example computing device 200 (FIG. 2). The operating system 300 may be, for example, Google™ Android™, Apple™ iOS™, UNIX™, Linux™, Microsoft™ Windows™, Apple OSX™ or the like.

The application software 310 adapts the example computing device 200, in combination with the operating system 300, to operate as a device performing a particular function. For example, the application software 310 may cooperate with the operating system 300 to adapt a suitable embodiment of the example computing device 200 to operate as the client devices 110, the property sensor systems 130, the resource server 160, or the insurance server 170.

While a single application software 310 is illustrated in FIG. 3, in operation the memory 220 may include more than one application software 310, and different application software 310 may perform different operations.

Figure 4:
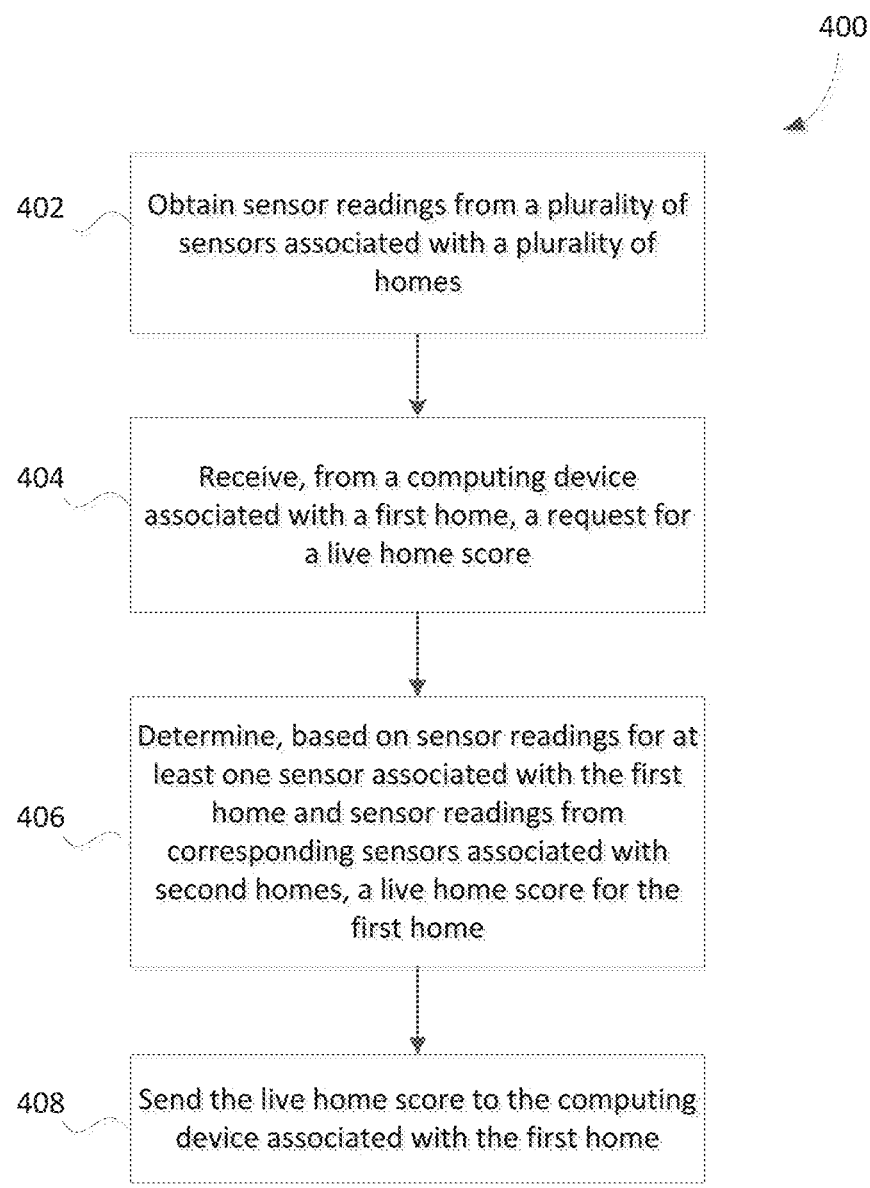
FIG. 4 shows, in flowchart form, an example method for generating a live property score for a property.

Reference is now made to FIG. 4, which shows, in flowchart form, an example method 400 for generating a live property score for a property. More particularly, the method 400 may be implemented by a computing system to obtain, in real-time, a score associated with a given building, such as a house. In some embodiments, the operations of method 400 may be performed as part of a centralized process for monitoring and automating control of a plurality of buildings. For example, a computing system that is connected with home sensor systems for a plurality of houses may generate a live home score for at least one of the plurality of houses in accordance with embodiments of method 400.

Operations starting with operation 402 and continuing onward are performed by the processor 210 (FIG. 2) of a computing device 200 executing software comprising instructions such as may be stored in the memory 220 of the computing device 200. For example, the operations of the method 400 may be performed by the resource server 160 (FIG. 1). More particularly, processor-executable instructions may, when executed, configure a processor 210 of the resource server 160 to perform all or parts of the method 400.

The embodiments of methods 400, 500, 600 and 700 provided below are described with reference to homes; however, it will be understood that these methods may be applicable more broadly for buildings or properties of various different types (e.g. commercial buildings, etc.).

In operation 402, the resource server obtains sensor readings from sensors associated with a plurality of homes. For example, the resource server obtains sensor readings from sensors that are associated with a plurality of houses. In at least some embodiments, a sensor system (such as property sensor system 130 of FIG. 1) associated with a house may be configured to transmit sensor readings from the sensors that are positioned at different locations throughout a house. The sensor readings from the sensors associated with a house may be collected and stored in a memory associated with the sensor system. For example, a list of the sensors associated with a house and sensor readings corresponding to the sensors may be stored in a database maintained or accessible by the sensor system for the house. The sensors may include one or more of: a water flow meter, a home alarm sensor, a water leak sensor, an electric power consumption meter, or a door and window sensor, among others.

In some embodiments, sensor readings may be obtained in response to queries generated by the resource server and directed to a computing system, such as a sensor system, that is associated with a house. In particular, the resource server may generate requests to obtain sensor readings for a plurality of sensors that are associated with a house, and sensor readings from the sensors may be provided in response to such requests. The sensor readings may be provided to the resource server by a sensor system, such as property sensor system 130, or the sensor readings may be obtained directly by the resource server. For example, the resource server may query a database storing sensor data (including sensor readings) for a plurality of sensors associated with a house, and the requested sensor readings for the house may be obtained as query results by the resource server.

Additionally, or alternatively, the resource server may be configured to poll sensors associated with one or more of the homes directly. That is, the resource server may communicate directly with sensors of a home, for receiving data (such as sensor readings) from one or more of the sensors and for transmitting data (such as instructions, control signals, etc.) to the sensors. The resource server may poll sensors for sensor readings at predefined regular intervals, or in response to certain trigger actions that prompt for collection of sensor data.

The obtained sensor readings may be stored in a memory that is accessible by the resource server. For example, the resource server may be configured to store sensor data, including obtained sensor readings, for sensors associated with a plurality of houses in a database that is managed by the resource server. The sensor data may include identifying information for the sensors, sensor readings, timestamps associated with the sensor readings, and indicator of current state (e.g. active, offline, etc.) of the sensors.

In operation 404, the resource server receives, from a computing device associated with a first one of the plurality of homes, a request for a live home score. In at least some embodiments, a live home score may be requested via an application, such as a home monitoring and control application, on a client device. A client entity, such as the owner or a manager of a house, may input a request to obtain a live home score for the house using an application on their client device. For example, the client entity may launch an application (e.g. home monitoring application) that includes a functionality for requesting a real-time score associated with a house that is owned by the client. Such request for a live home score may be transmitted to the resource server, for example, by a backend service associated with the application.

In some embodiments, a request for a live home score may be received from a computing system that is not directly associated with the first one of the plurality of houses (or "first home"). For example, an insurance server may transmit, to the resource server, a request for information relating to a particular home. The information may be requested by the insurance server in, for example, performing a risk assessment of the home. The insurance server may request, among other information, a real-time score associated with the home. The request for a live home score may be forwarded directly by the insurance server to the resource server.

In operation 406, the resource server determines a live home score for the first one of the plurality of homes. More specifically, the resource server determines the live home score based on sensor readings for at least one sensor associated with the first one of the plurality of homes ("first home") and sensor readings from corresponding ones of the sensors associated with at least one second one of the plurality of homes. In at least some embodiments, the resource server may first identify a set of sensors of the first home for which sensor readings have been obtained by the resource server. For example, the resource server may identify those sensors of the first home for which current sensor readings are stored (or are accessible) by the resource server, and retrieves the sensor data for the identified sensors (the "first sensors").

The resource server also identifies a subset of the plurality of homes that have associated sensor readings for sensors (the "second sensors") corresponding to the first sensors. In particular, the resource server identifies those homes, other than the first home, that have the same types of sensors as the first sensors whose sensor readings are available to the resource server. For example, if the first home has a set of three sensors (e.g. door sensor, window sensor, motion detector), then the resource server may identify other ones of the plurality of homes that have the same set (or superset containing said set) of sensors as the first home for which sensor readings are available.

In this way, the resource server may obtain corresponding sensor readings for sensors associated with the first home and a set of second homes (i.e. the other ones of the plurality of homes). Based on the sensor data for these sensors, the resource server determines a live home score for the first home. In particular, the resource server determines a score that is relative to live home scores for the second homes (which may be obtained by the resource server). That is, the live home score for the first home may be determined as a relative score. This relative score may be derived based on the sensor readings for the first sensors, the sensor readings for the second sensors, and the live home scores for the second homes.

In at least some embodiments, the resource server may derive the live home score for the first home as a relative score based on predetermined rules, principles, or heuristics. For example, for a particular type of sensor (e.g. window sensor), a lower value for a sensor reading may be associated with a higher live home score. Such relation may be based on a principle, such as a home security principle, that fewer counts of opening a window may result in less risk or vulnerability of the home to undesired intrusion. As another example, for a different type of sensor (e.g. temperature sensor), a higher value for a sensor reading may be associated with a lower live home score. Such relation may be based on a principle, such as a fire safety and prevention principle, that a temperature that exceeds a certain threshold may potentially result in overheating and even a fire hazard in the home. The principles that underlie these qualitative relationships between sensor readings and live home scores may be specified in a policy or guideline that is accessible by the resource server. By comparing the sensor readings from the first sensors and the second sensors, the resource server may determine a live home score for the first home that is relative to the scores assigned to one or more of the second homes.

Various statistical models may be used in obtaining the live home score for a home. In some embodiments, a quantile regression model with neural nets may be used. A quantile regression model is primarily used to understand data with outliers, when the behavior at the conditional mean fails to fully capture the patterns in the data. Just as regressions minimize the squared-error loss function to predict a single point estimate, quantile regressions minimize the quantile loss in predicting a certain quantile. A neural net can be built using Bayesian approximation of the quantile loss. The TensorFlow™ framework (or similar platform) provides co-learning across the quantiles for predictions. In particular, using TensorFlow, an arbitrary number of quantiles may be fit simultaneously.

In operation 408, the server sends the live home score for the first home to a computing device associated with the first home. For example, the live home score may be provided in response to a request inputted by a client entity using an application on their client device. The live home score may be presented as an absolute value, or as a relative score (e.g. score on a relative scale, percentile value, etc.) in relation to other ones of the plurality of homes.

Figure 5:
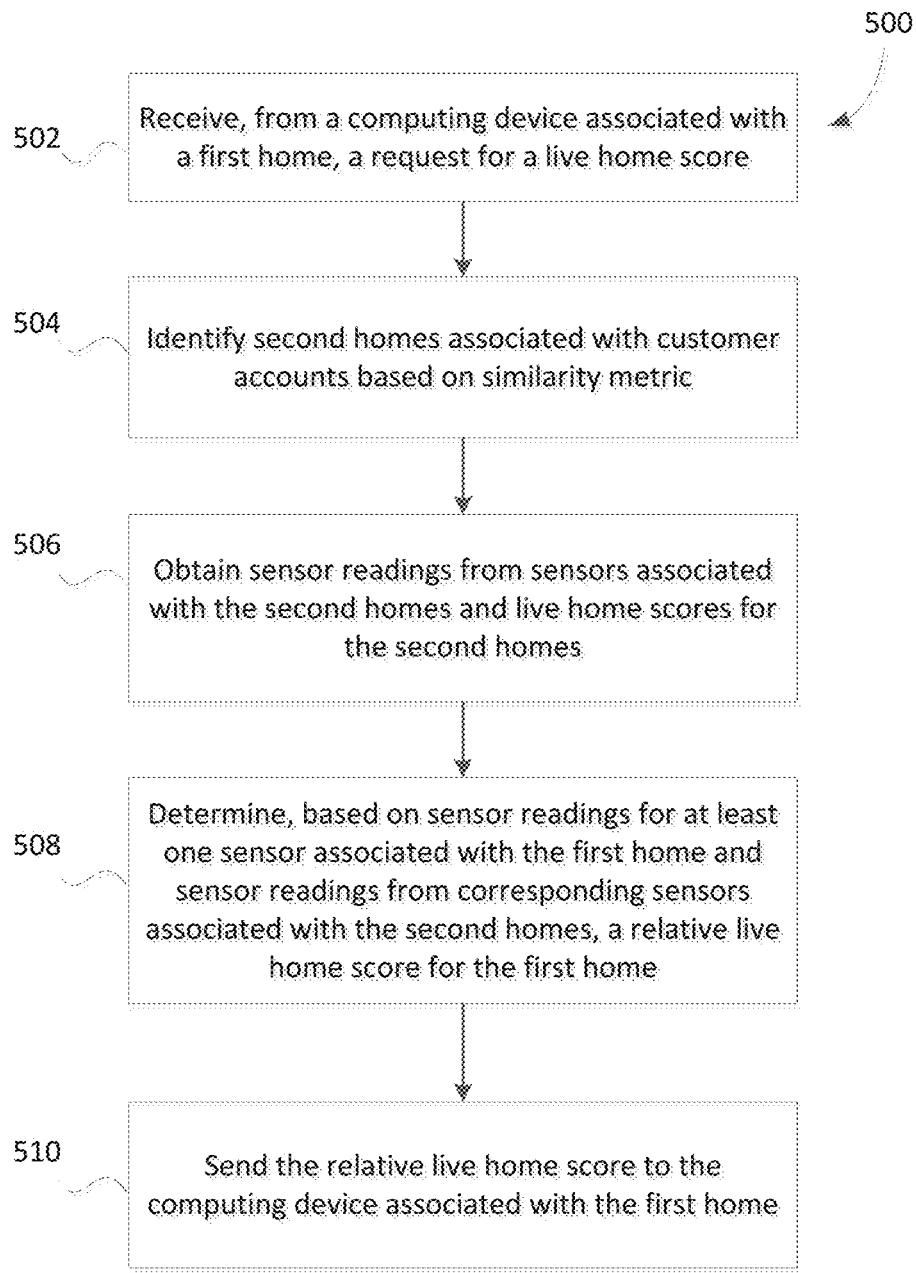
FIG. 5 shows, in flowchart form, another example method for generating a live property score for a property.

Reference is now made to FIG. 5, which shows, in flowchart form, another example method 500 for generating a live property score for a property. The method 500 may be implemented by a computing system to obtain, in real-time, a score associated with a given building, such as a house. In some embodiments, the operations of method 500 may be performed as part of a centralized process for monitoring and automating control of a plurality of buildings. For example, a computing system that is connected with home sensor systems for a plurality of houses may generate a live home score for at least one of the plurality of houses in accordance with embodiments of method 500.

Operations starting with operation 502 and continuing onward are performed by the processor 210 (FIG. 2) of a computing device 200 executing software comprising instructions such as may be stored in the memory 220 of the computing device 200. For example, the method 500 may be performed by the resource server 160 (FIG. 1). The operations of method 500 may be performed in addition to, or as alternatives of, one or more of the operations of method 400.

In operation 502, the resource server receives, from a computing device associated with a first home, a request for a live home score. This operation may be performed in a similar manner as operation 404 of method 400. For example, a request for a live home score may be inputted via an application on a client device, and the request may be transmitted to the resource server (for example, by a back-end service associated with the application). As another example, a computer system, such as an insurance server, that is different from the resource server may transmit a request for a live home score associated with a specific home. The request for a live home score may include, at least, identifying information (e.g. address, owner, etc.) of the first home and an identifier of the requesting entity.

In operation 504, the resource server identifies second homes that are similar to the first home. In particular, the resource server identifies, among homes that are associated with one or more customer accounts belonging to customers of an entity, those second homes that are similar. The resource server may identify the second homes based on determining that said homes satisfy one or more similarity criteria with respect to the first home. By way of example, the second homes may be homes that have one or more common properties as the first home. Such properties of the homes may include, without limitation: geographic location, neighbourhood, size (e.g. square footage), price range, structural design, year of build, number of rooms, etc. The information relating to homes associated with the customer accounts may be stored in a database that is managed or accessible by the resource server. A similarity metric may be used in determining whether a home satisfies a similarity criterion. For example, if a property of a home, such as square footage, geographic location, etc., is within a certain "distance" from the corresponding property of the first home, then the home may be considered to satisfy a similarity criterion (and therefore may be designated as one of the second homes). As another example, if a property of a home falls within a range that is defined about a value for the corresponding property of the first home, the home may be considered to satisfy a similarity criterion.

As described above, the resource server may determine the second homes that are similar to the first home based on the stored data about the homes. In operation 506, the resource server obtains sensor readings from sensors that are associated with the identified second homes as well as the live home scores for the second homes. For example, the resource server may poll one or more sensors that are associated with the second homes to obtain sensor readings from those sensors. Additionally, or alternatively, the resource server may receive sensor readings from property sensor systems that are associated with the second homes. The property sensor systems may collect sensor readings from defined sets of sensors that are associated with their respective homes, and the sensor readings can be provided to the resource server (e.g. in response to a request from the resource server identifying the sensors for which sensor readings are desired). The live home scores for the second homes may be stored in a database that is managed or accessible by the resource server. For example, the resource server may store, in memory associated with the resource server, identifying information for a plurality of homes, such as the homes associated with customer accounts, and live home scores for one or more of the plurality of homes. Such database may, for example, be updated by the resource server as live home scores are newly determined for the plurality of homes.

In operation 508, the resource server determines a relative live home score for the first home. In particular, the resource server determines the relative live home score based on sensor readings ("first sensor readings") for at least one sensor associated with the first home and sensor readings ("second sensor readings") from corresponding ones of the sensors associated the second homes. This operation may be performed in a similar manner as operation 406 of method 400. The relative live home score is determined based on comparing the first and second sensor readings, and using a policy or heuristic to determine what the live home score for the first home should be in relation to the live home scores for the second homes.

In operation 510, the resource server sends the relative live home score for the first home to the computing device associated with the first home. For example, the relative live home score may be displayed via a graphical user interface for an application, such as a home monitoring or insurance application, on the client device.

Figure 6:
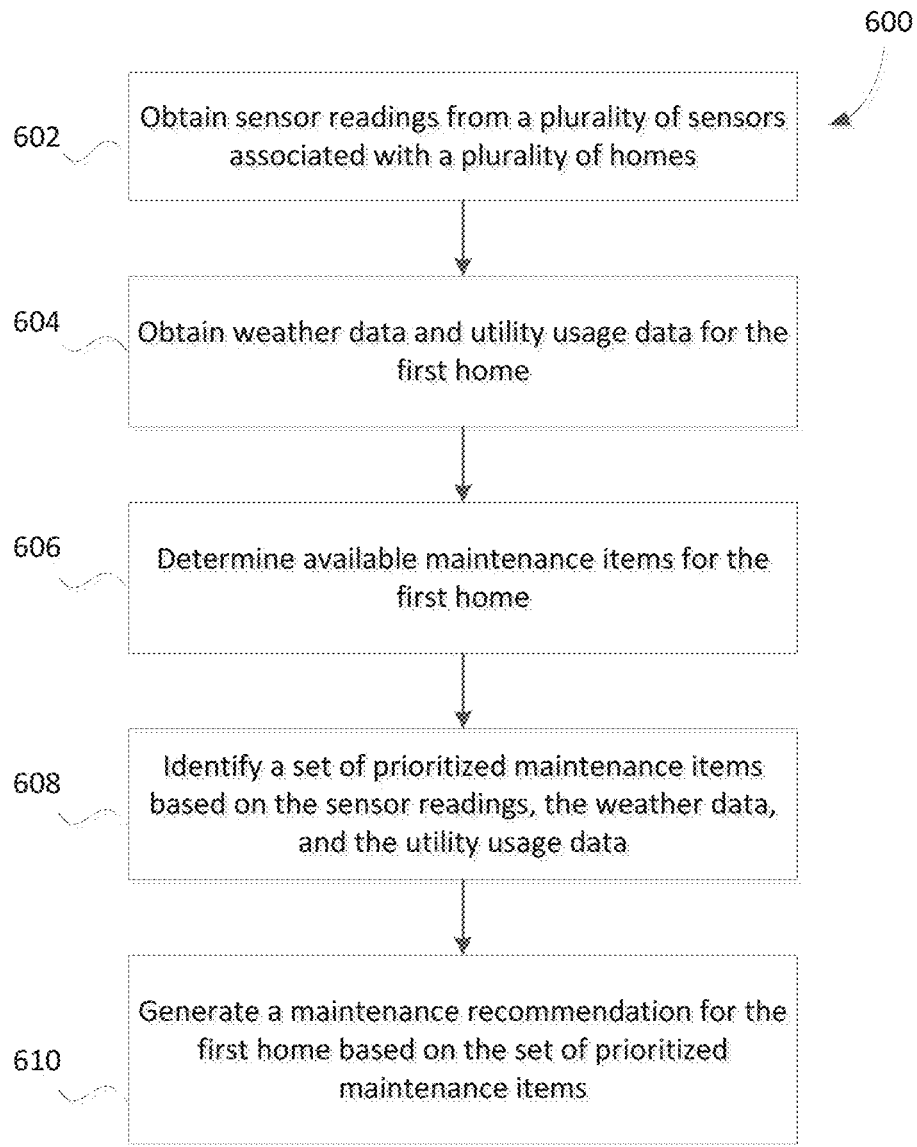
FIG. 6 shows, in flowchart form, an example method for automatically providing maintenance recommendations for a property.

Reference is now made to FIG. 6, which shows, in flowchart form, an example method 600 for automatically providing maintenance recommendations for a property. The method 600 may be implemented by a computing system to identify, in real-time, one or more home maintenance items for a home and to generate recommendations based on the identified home maintenance items. In some embodiments, various components of a property sensor system for a home, such as sensors, alarms, and actuators, may be controlled in accordance with the identified maintenance items and/or maintenance recommendations.

Operations starting with operation 602 and continuing onward are performed by the processor 210 (FIG. 2) of a computing device 200 executing software comprising instructions such as may be stored in the memory 220 of the computing device 200. For example, the method 600 may be performed by the resource server 160 (FIG. 1). The operations of method 600 may be performed in addition to, or alternatives of, one or more of the operations of method 400 and 500.

In operation 602, the resource server obtains sensor readings from a plurality of sensors associated with a plurality of homes. The sensor readings may be received by the resource server from property sensor systems associated with the plurality of homes, or obtained directly by the resource server by polling one or more sensors for the plurality of homes.

In operation 604, the resource server obtains weather data and/or utility usage data for the first home. In at least some embodiments, the weather data may be obtained via a weather application programming interface (API) query or by transmitting a request to a weather data service. For example, the resource server may make an API call to retrieve weather data for a specific geographic region. The utility usage data for a home may be obtained based on sensor and/or meter data associated with the home, or by requesting to retrieve customer-specific usage data from utilities. The utility usage data may indicate, for example, consumption of electricity, water, etc. for a particular home.

In operation 606, the resource server determines available maintenance items for the first home. The maintenance items may be identified based on sensor readings from sensor associated with the home, the weather data, and the utility usage data for the home. By way of example, the resource server may receive sensor readings from a water flow sensor that is included in a sewage line. If the weather data for the geographic region associated with the home indicates that a rainstorm is affecting or impending for the region and the water flow sensor readings suggest an unusual flow consistent with a possible drain blockage, the resource server determine that maintenance of the drainage system (e.g. repair of faulty fixtures, unclogging of pipes, etc.) is required for the home. Other maintenance tasks, such as changing filters in a furnace, repairing doors and windows, cleaning grills of wall furnace, checking for leaks in a washing machine, inspecting caulking, etc., are some examples of items that may be determined to be available for the home.

In operation 608, the resource server identifies a set of prioritized maintenance items based on sensor readings from sensors associated with a plurality of homes, the weather data, and the utility usage data. In at least some embodiments, the prioritized maintenance items for the first home may be identified by comparing, at least, the sensor data for homes that are similar to the first home. For example, sensor readings from sensors associated with homes that are in a similar geography as the first home may be used to derive the set of prioritized maintenance items.

For a large amount of data that may be obtained from the similar homes, machine learning models may be used to automate the process. By way of example, an alternating least squares (ALS) method may be employed for generating a recommendation model/engine for maintenance items. The ALS method is a machine learning technique that provides a collaborative filtering implementation. The recommendation engine may present a ranked list of maintenance items that are available for the first home. More specifically, ALS may be used for comparing sensor readings from homes in a same (or similar) geographic region as the first home to identify and rank maintenance items. An ALS model may be generated based on data relating to the plurality of homes, including geographic location data and sensor readings. Using such model, a personalized recommendation of maintenance items for the first home may be provided. The set of prioritized maintenance items may include, for example, a predefined number of the highest ranked maintenance items for the first home.

In operation 610, the resource server generates a maintenance recommendation for the first home based on the set of prioritized maintenance items. For example, a maintenance recommendation that lists a predefined number of highest ranked maintenance items for the first home may be generated by the resource server, and the maintenance recommendation may be transmitted to a computing device associated with the first home. The maintenance recommendation may, for example, be displayed in a graphical user interface for an application, such as a home monitoring application, on a client device.

In at least some embodiments, the resource server may be configured to provide, in addition to maintenance item recommendations, a set of recommendations relating to utility usage for the first home. More particularly, the resource server may determine a set of utility usage recommendation items for the first home based on sensor readings from sensors associated with a plurality of homes including the first home and the second homes. The recommendation items may, for example, include suggestions for optimizing utility usage in the first home. The resource server may send a message indicating at least a subset of the set of utility usage recommendations to a computing device associated with the first home, such as a client device of an owner or like entity. The recommendations may be formatted as data objects (e.g. messages, notifications, etc.) containing usage tips or advice for the first home. As in the case of maintenance recommendations, an ALS algorithm (or a like method for generating personalized recommendations) may be employed in comparing utility usage between a plurality of homes to make usage-related recommendations (e.g. suggestions for energy conservation).

Figure 7:
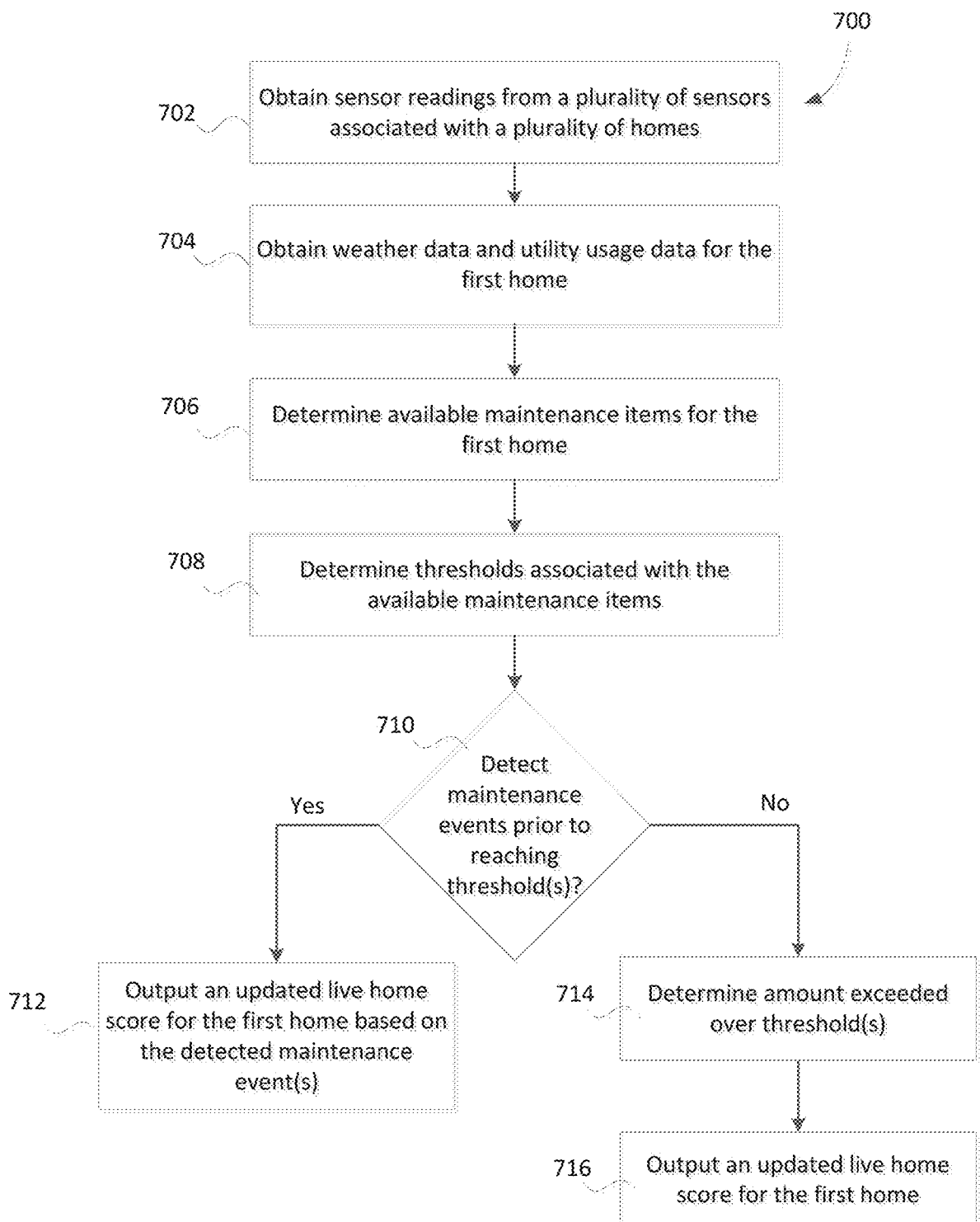
FIG. 7 shows, in flowchart form, an example method for real-time monitoring and control of a property.

Reference is now made to FIG. 7, which shows, in flowchart form, an example method 700 for real-time monitoring and control of a property. More particularly, the method 700 may be implemented by a computing system to update, in real-time, a score associated with a given building, such as a house. In some embodiments, the operations of method 700 may be performed as part of a centralized process for monitoring and automating control of a plurality of buildings. For example, a computing system that is connected with home sensor systems for a plurality of houses may generate and update a live home score for at least one of the plurality of houses in accordance with embodiments of method 700. Such computing system may, in at least some embodiments, provide control signals for one or more components of a home sensor system.

Operations starting with operation 702 and continuing onward are performed by the processor 210 (FIG. 2) of a computing device 200 executing software comprising instructions such as may be stored in the memory 220 of the computing device 200. For example, the method 700 may be performed by the resource server 160 (FIG. 1). More particularly, processor-executable instructions may, when executed, configure a processor 210 of the resource server 160 to perform all or parts of the method 700.

In operation 702, the resource server obtains sensor readings from a plurality of sensors associated with a plurality of homes. Additionally, the resource server obtains weather data and utility usage data for a first home, in operation 704. Operations 702 and 704 correspond to operation 602 and 604, respectively, of method 600 and may be performed in a similar manner as the latter operations.

In operation 706, the resource server determines available maintenance items for the first home. The maintenance items for the first home may be identified based on sensor readings from a plurality of homes including, at least, the first home, the weather data, and the utility usage data for the first home. Operation 706 may be performed in a similar manner as operation 606 of method 600.

In operation 708, the resource server determines thresholds associated with the available maintenance items. In at least some embodiments, the thresholds relate to values of sensor readings. More specifically, the resource server may establish threshold values in association with one or more of the sensors for the first home. By monitoring the sensor readings and the associated threshold values, the resource server may detect trigger conditions for maintenance tasks associated with the first home. For example, a threshold value may be established for a water flow sensor, such that if a value of water pressure, flow rate, etc. is detected to exceed the threshold, the resource server may determine that a maintenance event may be required.

The resource server may detect maintenance events prior to reaching one or more of the thresholds associated with the available maintenance items. A maintenance event may, for example, be a changing of filters in a furnace, repair of doors and/or windows, cleaning of grills of wall furnace, checking for leaks in a washing machine, inspecting caulking, etc. If a maintenance event is detected, the resource server may output an updated live property score for the first home based on the detected maintenance event, in operation 712. For example, a detected maintenance event may be a task that resolves a maintenance item identified for the first home. By virtue of performance of the maintenance task, the first home may be determined to be in a state that is more desirable than a previous state (in which the maintenance task had not been performed). Specifically, the first home may be determined to be more secure, less prone to hazards (e.g. fire, destruction from weather conditions, etc.), or more structurally sound. Accordingly, a live home score for the first home may be updated to reflect the change in state of the first home. For example, the live home score may be increased based on the detecting of the maintenance event prior to triggering of any thresholds associated with a maintenance event.

On the other hand, the resource server may determine that a threshold associated with a maintenance item is exceeded without a suitable maintenance event being detected. In such case, the resource server determines an amount exceeded over the threshold, in operation 714. That is, the resource server may measure an amount by which a sensor reading associated with the maintenance item exceeds the established threshold for the sensor. The resource server then outputs an updated live home score for the first home, in operation 716. In particular, the live home score may be updated based on a measured amount that the sensor reading exceeded the threshold value for the sensor.

In at least some embodiments, the resource server may be configured to generate control signals for transmitting to one or more sensors, alarms, and/or actuators associated with a plurality of homes. The control signals may be generated based on, for example, maintenance items that are identified for specific homes. For example, the resource server may identify a set of prioritized maintenance items for a home in accordance with embodiments described herein, and provide control signals designed for resolving the maintenance items or changing parameters associated with sensors relating to the maintenance items. By way of example, a control signal may include an instruction to change a frequency of measurement for one or more sensors. As another example, a control signal may include a command for an actuator to control such device(s) within the first home.

Figure 8A:
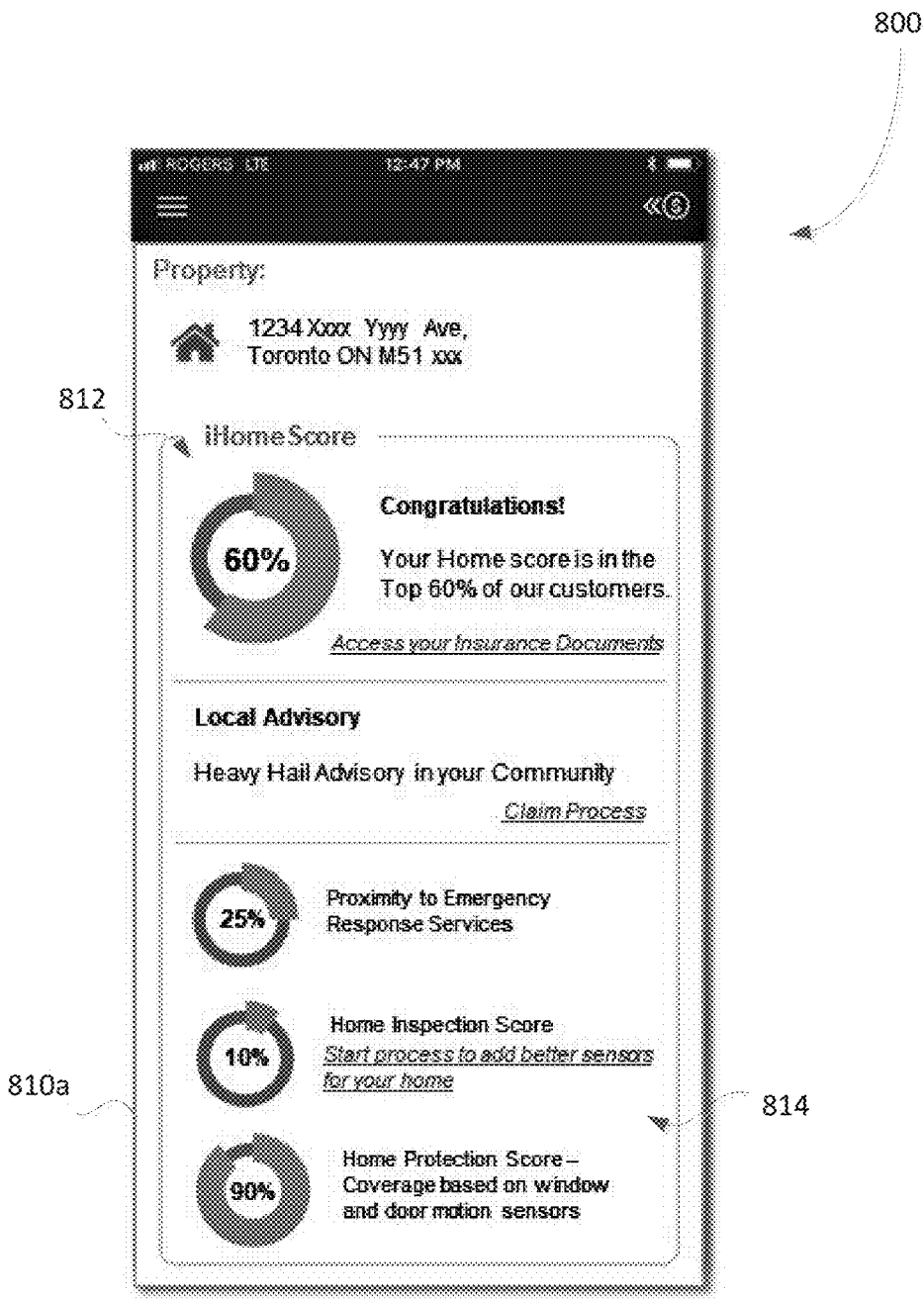
FIGS. 8A to 8C show example display screens of a graphical user interface for a home monitoring application.
Figure 8C:
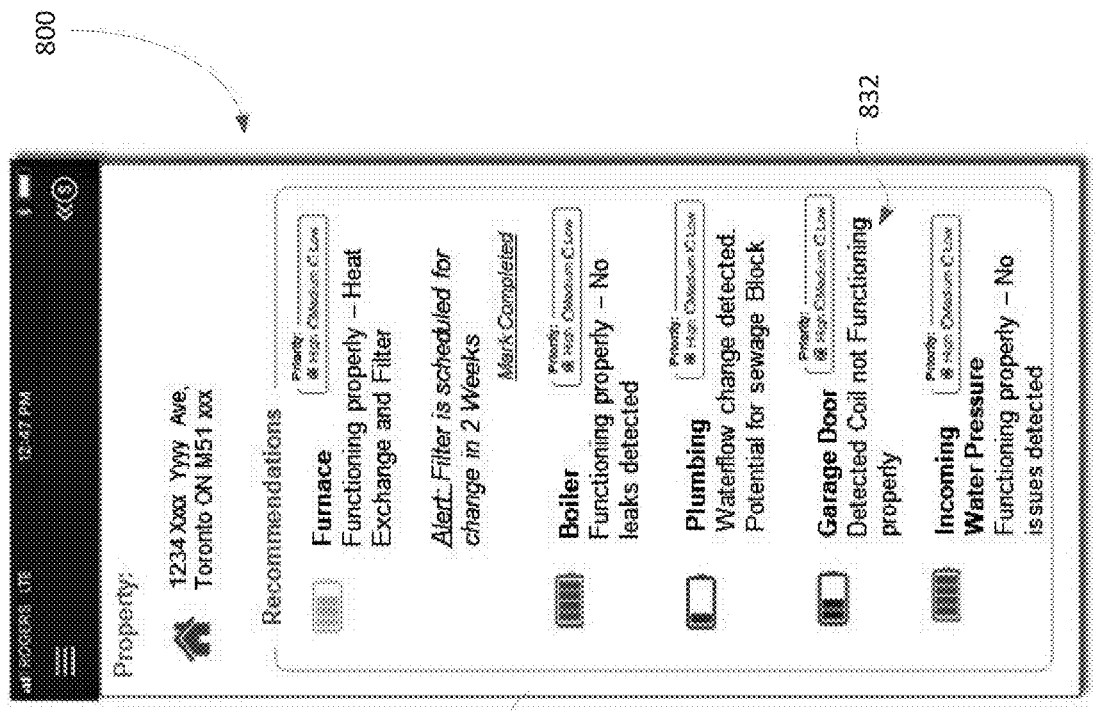
Figure 8B:
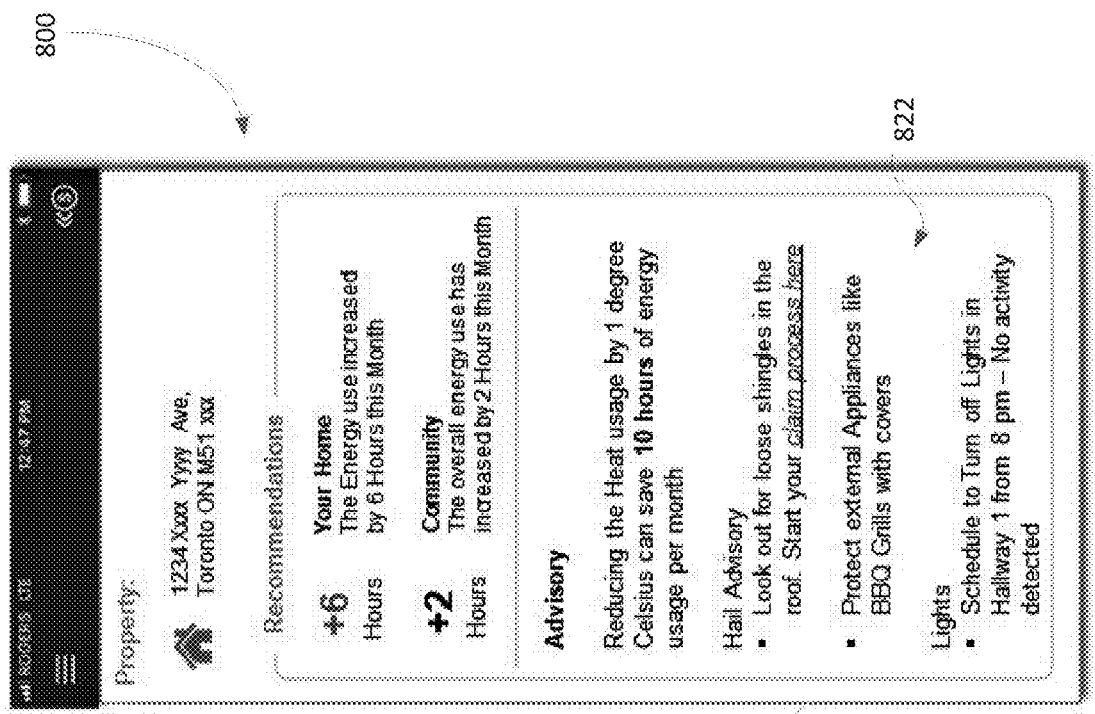

Reference is now made to FIGS. 8A to 8C, which illustrate example display screens 810a, 810b and 810c, respectively, of a graphical user interface 800 for a home monitoring application. The graphical user interface may be accessed via a client device 110 (FIG. 1). For example, the display screens 810a, 810b and 810c may be presented on a display associated with the client device 110.

As shown in screen 810a, the graphical user interface 800 may display a live home score 812 for a specific property, for which identifying information may be presented in screen 810a. In FIG. 8A, the live home score 812 is displayed as a relative score (i.e. percentile) in relation to a plurality of homes associated with customer accounts for a business entity. Other scores or indicators 814 for the property may be displayed on screen 810a. As illustrated, these scores may indicate, for example, proximity to predefined services, home inspection or assessment, and coverage for home protection.

Screens 810b and 810c show examples of information which may be displayed in the graphical user interface of the application, in addition to the live home score for the property. For example, screen 810b provides advisory information 822 and utility usage information, while screen 810c provides maintenance and utility usage recommendation items 832. The maintenance and utility usage recommendations may be categorized separately for each of a plurality of devices (e.g. sensors, actuators, mechanical devices, etc.) associated with the first home.

It will be understood that the applications, modules, routines, processes, threads, or other software components implementing the described method/process may be realized using standard computer programming techniques and languages. The present application is not limited to particular processors, computer languages, computer programming conventions, data structures, or other such implementation details. Those skilled in the art will recognize that the described processes may be implemented as a part of computer-executable code stored in volatile or non-volatile memory, as part of an application-specific integrated chip (ASIC), etc.

As noted, certain adaptations and modifications of the described embodiments can be made. Therefore, the above discussed embodiments are considered to be illustrative and not restrictive.

The invention claimed is:

1. A computing system, comprising:
   a processor; and
   a memory coupled to the processor, the memory storing instructions that, when executed, configure the processor to:
   obtain sensor readings from sensors associated with a first home and a plurality of second homes;
   determine a set of prioritized maintenance items for the first home based on comparing sensor readings from sensors associated with the plurality of second homes to identify and rank maintenance items;
   detect one or more maintenance events associated with one or more of the set of the prioritized maintenance items for the first home; and
   responsive to detecting the one or more maintenance events, output a live home score for representing a real-time score associated with the first home.

2. The computing system of claim 1, wherein the sensors comprise at least one of: a water flow meter, a home alarm sensor, a water leak sensor, an electric power consumption meter, or a door and window sensor.

3. The computing system of claim 1, wherein the live home score for the first home represents a score that is relative to live home scores for the plurality of second homes.

4. The computing system of claim 1, wherein the live home score for the first home is determined based on first sensor readings from the sensors associated with the first home, second sensor readings from the sensors associated with the plurality of second homes, and geographic location data associated with the first home.

5. The computing system of claim 4, wherein the first sensor readings are obtained from first sensors and the second sensor readings are obtained from second sensors corresponding to the first sensor.

6. The computing system of claim 1, wherein the instructions, when executed, further configure the processor to identify the plurality of second homes based on determining that the second homes satisfy one or more similarity criteria with respect to the first home.

7. The computing system of claim 1, wherein the instructions, when executed, further configure the processor to receive, from a device associated with the first home, a request for the live home score and wherein the live home score is outputted responsive to receiving the request.

8. The computing system of claim 7, wherein the instructions, when executed, further configure the processor to send the live home score and a message indicating at least a subset of the set of the prioritized maintenance items as maintenance recommendations to the device associated with the first home.

9. The computing system of claim 1, wherein the set of the prioritized maintenance items is determined based on at least one of weather data for a geographic region associated with the first home or utility usage data associated with the first home.

10. The computing system of claim 1, wherein the instructions, when executed, further configure the processor to:
   determine a set of utility usage recommendation items for the first home based on the sensor readings from the sensors associated with the plurality of second homes; and
   send, to a first device associated with the first home, a message indicating at least a subset of the set of the utility usage recommendation items.

11. A processor-implemented method, comprising:
   obtaining sensor readings from sensors associated with a first home and a plurality of second homes;
   determining a set of prioritized maintenance items for the first home based on comparing sensor readings from sensors associated with the plurality of second homes to identify and rank maintenance items;
   detecting one or more maintenance events associated with one or more of the set of the prioritized maintenance items for the first home; and
   responsive to detecting the one or more maintenance events, outputting a live home score representing a real-time score associated with the first home.

12. The method of claim 11, wherein the sensors comprise at least one of: a water flow meter, a home alarm sensor, a water leak sensor, an electric power consumption meter, or a door and window sensor.

13. The method of claim 11, wherein the live home score for the first home represents a score that is relative to live home scores for the plurality of second homes.

14. The method of claim 11, wherein the live home score for the first home is determined based on first sensor readings from the sensors associated with the first home, second sensor readings from the sensors associated with the plurality of second homes, and geographic location data associated with the first home.

15. The method of claim 14, wherein the first sensor readings are obtained from first sensors and the second sensor readings are obtained from second sensors corresponding to the first sensor.

16. The method of claim 15, further comprising identifying the plurality of second homes based on determining that the second homes satisfy one or more similarity criteria with respect to the first home.

17. The method of claim 11, further comprising receiving, from a device associated with the first home, a request for the live home score and wherein the live home score is outputted responsive to receiving the request.

18. The method of claim 17, further comprising sending the live home score and a message indicating at least a subset of the set of the prioritized maintenance items as maintenance recommendations to the device associated with the first home.

19. The method of claim 11, wherein the set of the prioritized maintenance items is determined based on at least one of weather data for a geographic region associated with the first home or utility usage data associated with the first home.

20. The method of claim 11, further comprising:
   determining a set of utility usage recommendation items for the first home based on the sensor readings from the sensors associated with the plurality of second homes; and
   sending, to a first device associated with the first home, a message indicating at least a subset of the set of the utility usage recommendation items.

* * * * *